United States Patent [19]
Harrison et al.

[11] Patent Number: 6,101,255
[45] Date of Patent: *Aug. 8, 2000

[54] PROGRAMMABLE CRYPTOGRAPHIC PROCESSING SYSTEM AND METHOD

[75] Inventors: David Michael Harrison, Mesa; James Edward Greenwood, Jr.; Kerry Lucille Johns-Vano, both of Scottsdale, all of Ariz.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/841,314

[22] Filed: Apr. 30, 1997

[51] Int. Cl.⁷ .................................................. H04L 9/00
[52] U.S. Cl. ......................... 380/52; 380/277; 380/278; 380/287; 713/150; 713/153; 713/189; 713/193; 713/200; 713/201
[58] Field of Search ............................... 365/189.01, 200; 395/821, 825, 826; 380/4, 9, 21, 28, 29, 37, 43, 48, 49, 50, 59, 252, 255, 277, 278, 287, 52; 713/150, 151, 153, 189, 193, 200, 201

[56] References Cited

U.S. PATENT DOCUMENTS

| | | |
|---|---|---|
| 4,075,691 | 2/1978 | Davis et al. . |
| 4,386,234 | 5/1983 | Ehrsam et al. . |
| 4,433,207 | 2/1984 | Best . |
| 4,590,552 | 5/1986 | Guttag et al. . |
| 4,603,381 | 7/1986 | Guttag . |
| 4,811,306 | 3/1989 | Boning et al. .......................... 365/200 |
| 5,469,507 | 11/1995 | Canetti et al. ............................ 380/30 |
| 5,533,123 | 7/1996 | Force et al. ................................ 380/4 |
| 5,584,039 | 12/1996 | Johnson et al. ......................... 395/826 |
| 5,610,839 | 3/1997 | Karolak et al. . |
| 5,825,889 | 10/1998 | Dent ......................................... 380/49 |

OTHER PUBLICATIONS

"Cypris* CrYPtographic Reduced Instruction Set Microprocessor", Lockheed Martin, pp. 1–4.

"Applied Cryptography Second Edition", Bruce Schneier, John Wiley & Sons, Inc., pp. 216–225.

*Primary Examiner*—Bernarr E. Gregory
*Attorney, Agent, or Firm*—Gregory J. Gorrie

[57] ABSTRACT

A programmable crypto processing system (10) includes several processing resources (14, 16, 26) implemented on a single ULSI die. The processing system is both key and algorithm agile allowing for simultaneous execution of a variety of cryptographic programs through the use of background staging of the next program and context (key and state) during execution of a current program. The programmable crypto processing system includes a programmable crypto processor (17) for processing data units in accordance with a channel program, a crypto controller (11) for identifying a channel program, two interface processors (13, 15) for asynchronously receiving and transferring data units from and from an external host. Data units identify a particular channel program, and are processed in a selected processing engine in accordance the identified channel program. The interface processors are capable of full duplex operation and provide full physical data interface isolation for processing plain-text and cipher-text data.

29 Claims, 5 Drawing Sheets

PROGRAMMABLE CRYPTOGRAPHIC PROCESSING SYSTEM AND METHOD

FIELD OF THE INVENTION

This invention relates in general to the field of secure cryptographic communications.

BACKGROUND OF THE INVENTION

Trends in the communication marketplace have clearly defined the need for security for both commercial and military markets. As communication systems become more sophisticated with complex communication services and capabilities, it is important to keep information secure. One of the problems with secure equipment is the protection of the cryptographic programs from exploitation by means of reverse engineering techniques. Hardware implementations of cryptographic programs where the cryptographic program is embedded in hardware are generally considered secure. A problem with hardware implementations is that an adversary can use a concerted effort to determine the program by way of die probing and analysis. Another problem with hardware implemented cryptographic systems is the high cost semiconductor processing for chips that process cryptographic programs. The semiconductors are fabricated under secure conditions because the cryptographic programs are embedded in the hardware logic.

Cryptographic programs implemented with software, however, are typically not considered as secure as hardware implementations because of the accessibility of the software. A typical problem with software implementations is that concurrent processing of multiple programs results in performance loss due to task swapping in a secure operating system. Another problem with software implementations is that the arithmetic logic units of typical microprocessors and digital signal processors do not have the high speed parallel, numeric and logic processing resources that are desirable for high speed cryptographic processing.

A problem with both hardware and software cryptographic processing systems is the vulnerability of key variable data when exchanged between subsystems. This is a security risk common with current cryptographic systems.

Thus, what is needed are an improved cryptographic processing system and method. What is also needed are a cryptographic processing system and method that does not include the crypto programs and can be processed in commercial semiconductor foundries reducing the cost of semiconductor processing. What is also needed is a cryptographic system for high performance cryptographic program processing. Furthermore, what is also needed is a cryptographic system which can concurrently process multiple programs. What is also needed are a cryptographic processing system and method that is key and algorithm agile. What is also needed are a cryptographic processing system and method which rapidly and securely switches programs (e.g., algorithms) and context on each data unit processed. What is also needed is a cryptographic system that protects key variable data when exchanged between different subsystems. Furthermore, what is also needed is a cryptographic system where the cryptographic programs are protected from reverse engineering.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a programmable crypto processing system and method. The present invention also provides a crypto processing system suitable for processing high performance cryptographic programs. The present invention also provides a system and method for concurrently processing multiple cryptographic programs. The present invention also provides a cryptographic processing system and method which rapidly and securely switches programs (e.g., algorithms) and context on each data unit processed. The present invention also provides a cryptographic processing system and method that protects key variable data when exchanged between different subsystems. The present invention also provides a system and method suitable for processing cryptographic programs in a fail-safe architecture. The present invention also provides a programmable crypto processing system and method that reduces semiconductor processing costs associated with typical crypto-processing systems. In the preferred embodiments, the security of key variable data is preserved when exchanged between subsystems. Also in the preferred embodiments, cryptographic programs may be updated in fielded equipment. Also in the preferred embodiments, cryptographic programs are protected from reverse engineering.

Figure 1:
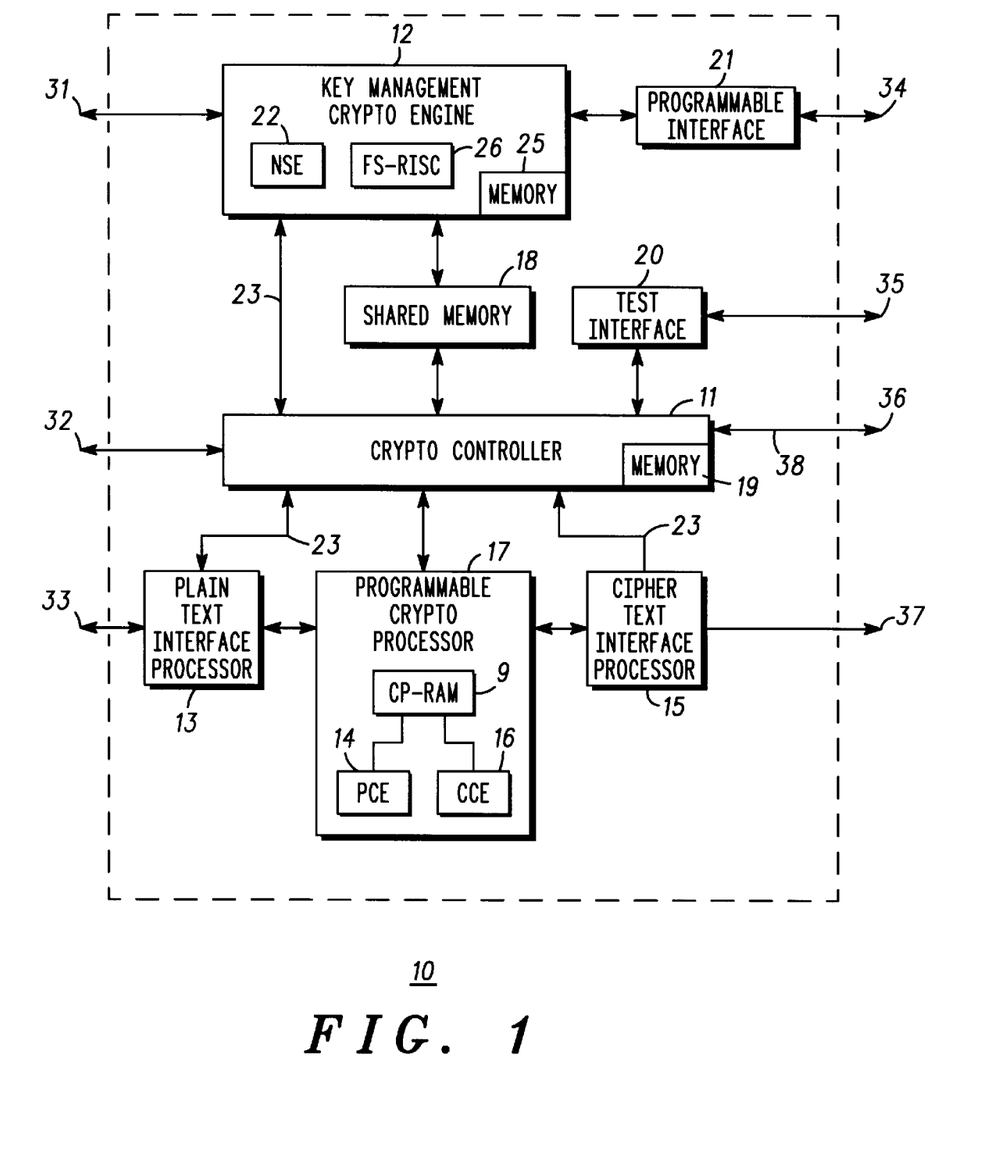
FIG. 1 illustrates a hardware block diagram of a programmable crypto processing system in accordance with a preferred embodiment of the present invention.

FIG. 1 illustrates a hardware block diagram of a programmable crypto processing system in accordance with a preferred embodiment of the present invention. Crypto processing system 10 has, in the preferred embodiment, two primary processing elements, Key management crypto engine (KMCE) 12 and programmable cryptographic processor (PCP) 17. PCP 17 comprises two processing engines, programmable cryptographic engine (PCE) 14 and configurable cryptographic engine (CCE) 16. The processing engines perform the execution of channel programs. System 10 also includes cryptographic controller (CC) 11 which performs the program management for the processing engines. System 10 also includes plane text interface processor (PTIP) 13 and cipher text interface processor (CTIP) 15 which provide external interfaces and signaling for system 10. The interface processors also provide a high performance secure flexible buffer between an external host and the internal processing systems of system 10. System 10 also includes shared memory 18 which serves as an elastic buffer between KMCE 12 and PCP 17. System 10 also includes programmable interface 21 coupled with FILL and CIK ports 34. Testing of system 10 may be performed using test interface 20 which includes on-chip emulation and JTAG ports 35.

KMCE 12 includes internal memories 25 and is coupled to CC 11 by internal bus 23. Other internal busses 23 couple PTIP 13, CTIP 15, PCP 17 and shared memory 18 to CC 11.

In the preferred embodiment KMCE 12 also contains fail-safe reduced instruction set computer (FS-RISC) 26. KMCE 12 preferably includes a second processing resource such as a mod N solution extractor (NSE) 22. FS-RISC 26 is preferably comprised of dual 32 bit RISC cores, which execute an embedded secure operating system (SOS). The secure operating system provides segmentation and task management to allow tasks to be executed from a program memory external to system 10. Such tasks may include tasks and subroutines that do not perform secure processing or handle sensitive data. Tasks and subroutines that perform secure processing or handle sensitive data are preferably executed from an internal program memory (ROM) included in memories 25.

In the preferred embodiment of the present invention, the functions performed by the FS-RISC's SOS from internal ROM include, among other things, master control of system 10, self-test and alarm monitoring of the system 10, program loading and real-time multi-level secure task management. Program loading includes loading of both secure and non-secure programs into either internal memories 25 or the loading of algorithms or programs to PCP 17.

FS-RISC 26 may also run application software from internal program memories (RAM) of memories 25. Typical application software running on FS-RISC 26 from internal program RAM includes functions such as CIK and fill-port processing for low level handling of sensitive data. Examples of this include the loading of keys. Examples of other application software running would include session key generation, by for example, public key programs and other key management and control functions. Application software may also include system management and key management functions such as loading, verifying, changing and auditing.

FS-RISC 26 may also run application software from external program memories. These external program memories may be RAM of an external host system. Such application software running from external program RAM preferably includes functions such as interface protocol processing (e.g., DS-101 and NSA 87-27), key management operations, command processing, non-secure program software and software not directly related to the handling of sensitive data.

PCP 17 is a high performance programmable superscaler cryptographic processing element which among other things, performs functions on data units and processes data units. Data units are loaded into either interface processor 13 or interface processor 15, preferably by an external host. CC 11 initiates processing of a data unit by instantiating (loading) the required context, program code, state and variable upon reading data unit header information. Once a data unit is loaded into PCP 17 and the processing is performed, the result is written to the output interface processor. A processed data unit may alternatively be provided to another destination such as KMCE 12 for further processing.

CC 11, among other things, manages the overall data movement among interface processors 13 and 15 and the execution resources of crypto-engines 14 and 16, NSE 22 and FS-RISC 26. CC 11 operates generally as a secure real-time operating system by determining the data to move, the tasks to install in PCP 17, and when to initiate the execution of a program. CC 11 accomplishes this by examining the contents of each data unit. This is discussed in detail below. This data driven architecture provides system 10 with high performance processing capabilities. Additionally, CC 11 performs background staging. Next tasks and data units are staged during execution of present tasks. The background staging allows for the high throughput of system 10. For example, data unit transfer to PCP 17, memory cleanup and program loading for the next data unit are performed during processing of a previous data unit.

In a preferred embodiment of the present invention, PCP 17 comprises, among other elements, two high speed processing engines, PCE 14 and CCE 16, which perform functions such as channel encryption and decryption and other data processing typically performed in secure communications and signaling. In the preferred embodiment, PCE 14 performs codebook style programs while CCE 16 performs combiner style programs. PCE 14 and CCE 16 operate independently and in combination provide more than 1200 MIPs of processing power for 32 bit data. In the preferred embodiments of the present invention, PCE 14 and CCE 16 are comprised of high-performance 32-bit RISC processors running at around 100 megahertz in a four stage pipeline configuration. These RISC processors, among other things, may also be used for data processing such as in-band signal processing, error detection and correction, and other protocol and format processing as defined by a channel program.

PCP 17 also includes a crypto processor RAM 9 (CP-RAM) for storing channel programs and/or data units. CC 11 downloads a channel program from CP-RAM 9 to a memory of a processing engine prior to processing a data unit. CC 11 also downloads channel program context from CP-RAM 9 to a memory of a processing engine prior to processing a data unit.

KMCE 12 performs, among other things, the master control functions for system 10. In the preferred embodiment, KMCE 12 contains a secure operating system (SOS) embedded in ROM within KMCE 12. In the preferred embodiment, FS-RISC 26 is a high performance 32 bit RISC processor. In addition to FS-RISC 26, KMCE 12 preferably includes a math coprocessor suitable for public key program processing. In this embodiment, KMCE 12 has around 150 MIPs processing capability to allow the execution of multiple channel and single channel embedded applications.

In other embodiments, system 10 may serve as an embedded cryptographic processing element for a variety of applications. For example, system 10 may allow data flow through architectures or coprocessor architectures to be implemented. In the data flow through architecture, data may flow from plain text interface port 33 to cipher text interface port 37 or vice versa. The internal security mechanisms embodied in system 10 help isolate the logically different data types such as the sensitive plain text data and variables from the protected cipher text data. In the coprocessor architecture implementation, a host system for example, desirably provides greater design assurance for isolating the types data.

In the preferred embodiments of system 10, PTIP 13 and CTIP 15 include 8-bit, 16-bit and 32-bit parallel data interfaces at ports 33 and 37 with FIFO control structures. Interface processors 13 and 15 also preferably include serial asynchronous and serial synchronous interfaces. PTIP 13 and CTIP 15 include internal processors, internal physical memory and external memory expansion capability. The memories of the interface processors are managed by their internal processors. In the preferred embodiment, the interface processors are capable of full duplex operation and provide full physical data interface isolation for processing plain-text and cipher-text data.

Interface ports 31 are associated with KMCE 12, and preferably includes ports for memory interface, configuration signals, system clock and interrupts. In the preferred embodiment, the memory interface port is comprised of a 33 bit data bus, a 24 bit address bus and a control interface for accessing internal memory or I/O devices. In the preferred embodiment of system 10, KMCE 12 receives commands and data through either PTIP 13 or CTIP 15. Other embodiments allow control and data to come from interface port 31.

System 10 also includes context memory bus 38 (CNTX) which connects to context port 36. In the preferred embodiment, context memory bus 38 is comprised of a 33-bit data bus and an address control bus which are used to couple to an external context memory. CC 11 manages the swapping of context from an active task in PCP 17 to an inactive task in the external context memory. Bus 38 allows for high speed context changes for applications requiring more concurrent tasks than may reside in internal memory. Port 32 provides an interface to CC 11 for control signals and discrete alarms signals.

Context, as used herein, includes, for example, information associated with specific channel programs and may include state or variable information, keys and function information associated with channels.

In the preferred embodiments, the cryptographic processing system of the present invention is embodied in an ultra large scale integrated (ULSI) device, preferably on a single silicon die. In the preferred embodiment, several processing subsystems are integrated into the ULSI result in approximately 1350 MIPs of processing capability suitable for a wide variety of cryptographic program classes.

Figure 2:
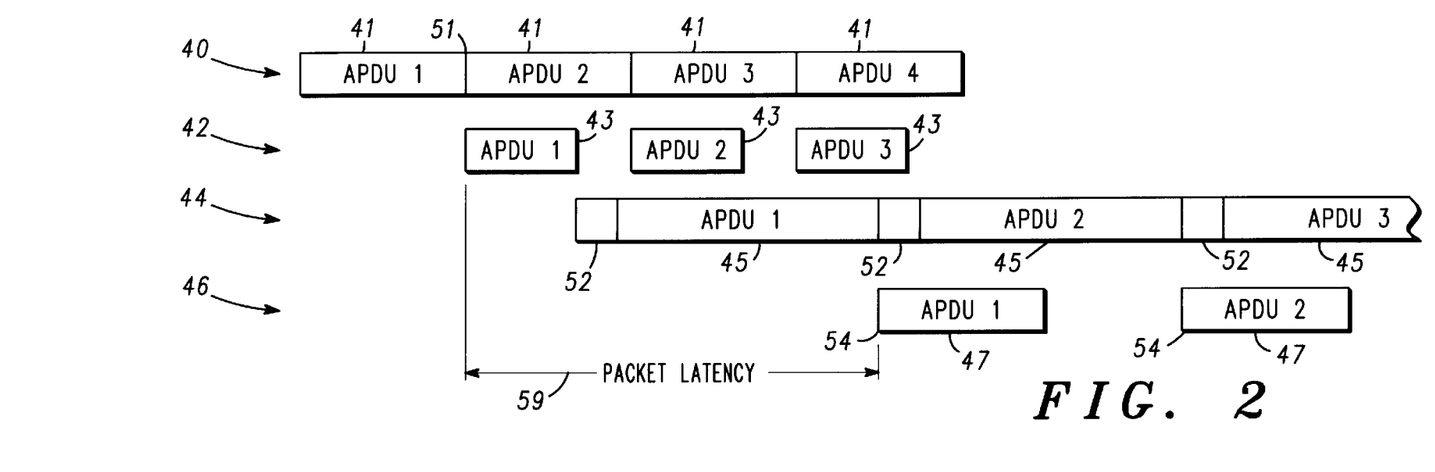
FIG. 2 illustrates the processing of data units in accordance with a preferred embodiment of the present invention.

FIG. 2 illustrates the processing of data units in accordance with a preferred embodiment of the present invention. The architecture of the cryptographic processing system of the present invention allows for the processing of multiple channel packetized communication threads with a very high throughput. Asynchronous operations between internal subsystems and an external hosts are managed by a finite state machine in CC 11.

In reference to FIG. 2, data units 41 are transferred from an external host to one of interface processors 13 or 15 (FIG. 1), shown as time-line 40. The interface processor notifies CC 11 that a new data unit 41 is ready for processing by sending the data unit's header to CC 11 at time 51. Based on information in the header of data unit 41, CC 11 instructs the interface processor to move the data unit to an appropriate processing subsystem, such as the KMCE 12, PCE 14, or CCE 16. Preferably, only a portion of the data unit is transferred to the processing engine, for example, everything but the header.

When a data unit has been staged to be processed by one of the engines in PCP 17, CC 11 schedules and starts the processing. By arbitration, CC 11 preferably maximizes data unit transfers to maximize concurrent processing in system 10. In time-line 42, data unit 41 is transferred to a memory such as CP-RAM 9 (FIG. 1) wherein it waits to be processed by the appropriate processing engine (e.g., PCE 14 or CCE 16). This background staging of the next data unit to be processed helps minimize latency through system 10. Furthermore, background staging of programs helps assure that the resources of PCE 14 or CCE 16 are processing data units and not moving data or programs. Accordingly, the data throughput of system is significantly increased.

Time-line 44 shows the time period in which a processing engine is processing data unit 45 and transferring the processed data portions to the output interface processor. Time frame 52 is a context switch time which is typically one clock cycle during which keys and programs are switched. The interface processor notifies CC 11 at time 51 that a new data unit is ready to be processed. During time-line 44, processed data units are transferred from the processing unit to the output interface processor. The data unit processing is completed at time 54. At this time, the output interface processor notifies an external host that a data unit has completed processing and is available. Data units 47 are processed data units, and are transferred to the external host during time-line 46. A packet latency 59 associated with processing the data units is shown as the time from packet receipt in the input interface processor to the time the processed data unit is ready to be transferred to the external host.

As can be seen from the processing diagram of FIG. 2, data units are processed by the processing engine (e.g., PCE 14 or CCE 16) after the entire packet is received by the processing unit (PCP 17). Furthermore, data units are not available for transfer to the external host until the entire data unit is processed. Data units are preferably comprised of a plurality of Dwords (32 bit words), each of which is individually processed and then transmitted from the processing unit to the output interface processor on a continual basis as the processing is performed. In the preferred embodiment, an external host is notified after the entire data unit has completed processing and is available in the output interface processor. Complete data unit processing helps avoid deadlocks that may occur due to actions from an external host.

The output interface processor is typically the interface processor associated with the opposite interface port from where the data unit originated. For example, data originating at plain text interface port 33, after it is processed, is sent to CTIP 15 and made available at cipher text interface port 37.

In the preferred embodiment, data units are loaded asynchronously into interface processor 13 or 15 by a host system and are managed by the interface processors. Data units scheduled for execution by PCE 14 or CCE 16 are dispatched and stored in a memory associated with the processing unit (e.g., CP-RAM 9). When the processing engine is FS-RISC 26, data units ready for processing are stored in memory 25. Interface processors 13 and 15 perform such functions as data unit parsing, prioritizing, parallel to serial and serial to parallel conversions, packet integrations, checkword generation and memory management functions.

In the preferred embodiment of the present invention, data units processed by system 10 are specially formatted for processing by system 10. In this embodiment, interface processors 13 and 15 process data in an APDU format discussed below. However, stream data not in APDU format may be received at the parallel or serial ports of the interface processors and converted into APDU format for processing.

Figure 3:
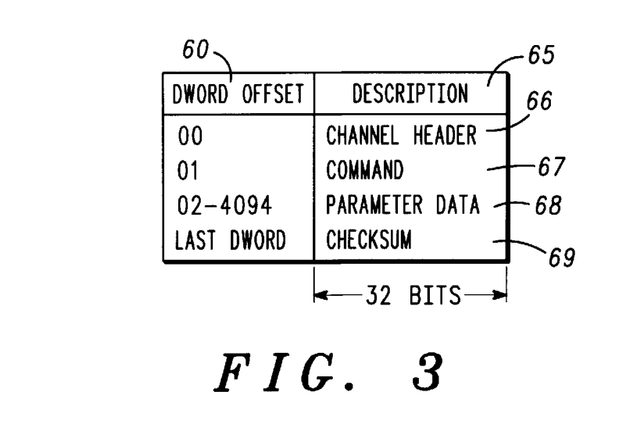
FIG. 3 illustrates a data unit format suitable for use with the preferred embodiment of the present invention.

FIG. 3 illustrates a data unit format suitable for use with the preferred embodiment of the present invention. Data unit in APDU format is illustrated in FIG. 3. A data unit in APDU format is comprised of a series of Dwords. Each Dword has an offset shown in column 60. The first Dword is channel header Dword 66 which is preferably a 32 bit Dword. Channel header Dword 66 is followed by command Dword 67, having a Dword offset of one. Following command Dword 67 is parameter data field 68 having Dword offsets between 2 and 4094. Parameter data field 68 of an APDU contains the application payload. The data in field 68 may have a different format for each channel since an application program can context swap for each data unit. For example, when multiple programs are executing in system 10 for multiple channels, some channels may need more robust protocols to assure lock step processing for a communication thread.

The final Dword is check sum Dword 69, which is preferably a 32-bit frame check sequence (FCS) which is calculated over an entire APDU. Check sum (CS) Dword 69 is an optional field that may be enabled or disabled for a specific application. During the startup procedure, KMCE 12 configures CC 11 and determines whether or not check sums are appended to each APDU.

One suitable FCS program is a 32-bit version of the ISO 3309-1964 E specification. This specification defines high level data link control procedures and frame structure for information processing systems and data communications.

Figure 4:
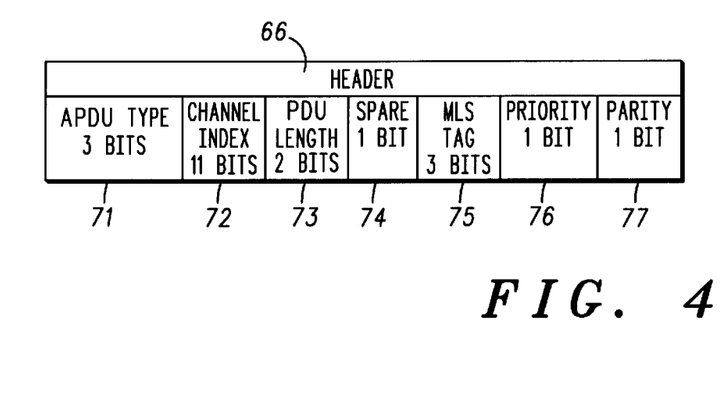
FIG. 4 illustrates a channel header format suitable for use in a preferred embodiment of the present invention.

FIG. 4 illustrates a channel header format suitable for use in a preferred embodiment of the present invention. The channel header format defines the size and location of the fields in channel header Dword 66. Channel header Dword 66 includes APDU type field 71 of 3 bits, channel index field 72 of 11 bits, PDU length field 73 of 12 bits, spare bit 74, MLS tag field 75 of 3 bits, priority bit 76 and a parity bit 77. MLS tag field 75 and priority bit 76 are optional. APDU type field 71 defines a value for the APDU type and its corresponding significance. Preferably, APDU type field 71 defines the source of the APDU, for example, from the PTIP 13 or CTIP 15, or from another internal source of system 10. APDU type field 71 preferably also indicates the output processor which is to receive the data unit.

APDU type field 71 also specifies whether the APDU is a request or response APDU. For response APDUs, channel index field 72 no longer contains a channel index but instead contains a 3-bit request program number (RPN) given in the command Dword of the requesting APDU. CC 11 uses APDU type field 71 to, among other things, determine the use of channel index field 72.

Channel index field 72 defines whether the data unit is calling a normal channel or if the data unit is calling an internal resource. For example, when the first bit of channel index is one, the last 10 bits may identify a channel program to use in a channel table discussed below. The channel table specifies the characteristics of a channel. CC 11 manages the channel table as context and programs are moved into and out of active channel memories of the execution units. When a channel is created, entries are added to the channel table. When a channel table entry is removed, the channel becomes inactive. Inactive channel tables are ones that the state and variable data and/or the program has been moved to storage locations not accessible by the state machine of CC 11. An application program operating on FS-RISC 26 may re-allocate a channel program from the table and removes the data from PCP 17. The memory used to store the inactive channel data can be in KMCE 12 or an external context memory.

Regarding channel index field 72, if the first bit of the channel index is zero, the data unit may be requesting an internal resource for processing. The next 10 bits of this channel index indicate which internal resource is being requested. Internal resources include PTIP 13, CTIP 15, CC 11, a randomizer within PI 21, and FS-RISC 26.

PDU length field 73 preferably indicates the number of Dwords including an optional CS Dword that follows the command Dword 67. Length field 73 defines the size of the application data. In the embodiment shown in FIG. 3, the maximum application data unit size is 4094 Dwords which is 131,008 bits.

MLS tag field 75 specifies the security level of the APDU. In the preferred embodiment, the value in MLS tag field 75 is compared to the value of a MLS tag of a key associated with the channel. When the two tags do not match, the data unit is rejected and an error condition is set. In the preferred embodiment of the present invention, the key's MLS tag is either loaded with the key or specified at the time of key creation. The key's MLS tag is preferably based on a security level used to create the key.

Priority bit 76 defines a priority level for the APDU. The priority bit is preferably used by the interface processor 13 or 15 to select the order of data unit processing. In the embodiment shown, there are two levels of priority. A zero, for example, may be used to specify non-real-time processing while a one may be used for specifying real-time processing.

Parity bit 77 is preferably added to every header Dword. CC 11 checks the parity on the header words as the header is processed.

Figure 5:
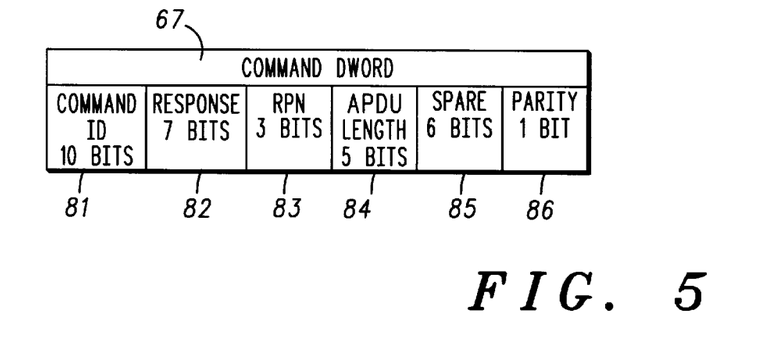
FIG. 5 illustrates a command D-word format suitable for use in a preferred embodiment of the present invention.

FIG. 5 illustrates a command D-word format suitable for use in a preferred embodiment of the present invention. Command Dword 67 is preferably the second Dword in each APDU. Command Dword 67 includes command ID field 81 of 10-bits, response field 82 of 7-bits, request program number (RPN) field 83 of 3-bits, APDU length field 84 of 5-bits, spare bits 85, and parity bit 86. In the preferred embodiment command ID field 81 specifies the function to be executed on a data unit. Functions are preferably defined for each channel program. In the preferred embodiment, there are no functions native to system 10. Functions may include for example, encrypt, decrypt, sign, authenticate, etc. A function such as encrypt for example, specifies to the application software that the data portion of the APDU, (e.g., parameter data field 68), should be encrypted. The encryption is performed using a channel program and key specified for that channel selected by channel index field 72.

Response field 82 returns a processing status with the processed data unit. The response is generated by the processing unit of system 10. For example, PCE 14 may provide a 'processing complete' response to response field 82 at the conclusion of sending the data unit to the output interface processor. Likewise, CC 11 may send a 'default' response value to the sending processor when the data unit transfer fails. Response field 82 may be dependent on the specific application or channel program.

RPN field 83 is used in a request type APDU to identify which program issued the request. CC 11, for example, may use the RPN to map to one of the processes currently operating on one of the cryptographic engines. RPN field 83 returns a value in a response APDU channel index which allows CC 11 to route the APDU to the correct processor. In the preferred embodiment, when the APDU originates from an external host the RPN field is not used and is set to zero. By identifying programs, RPN field 83 requests and passes commands, parameters and data between different channel programs running on the execution units of system 10. Since the processing units may run programs concurrently, the processing units also use the data units in the communication structure. Accordingly, through the use of RPN field 83, programs may transfer information between themselves using the CC 11.

APDU length field 84 defines the size of the APDU. Parity bit 86 is added to the header of command Dword 67. CC 11 may check the parity on the header words as it processes command Dword 67 (FIG. 3).

Figure 6:
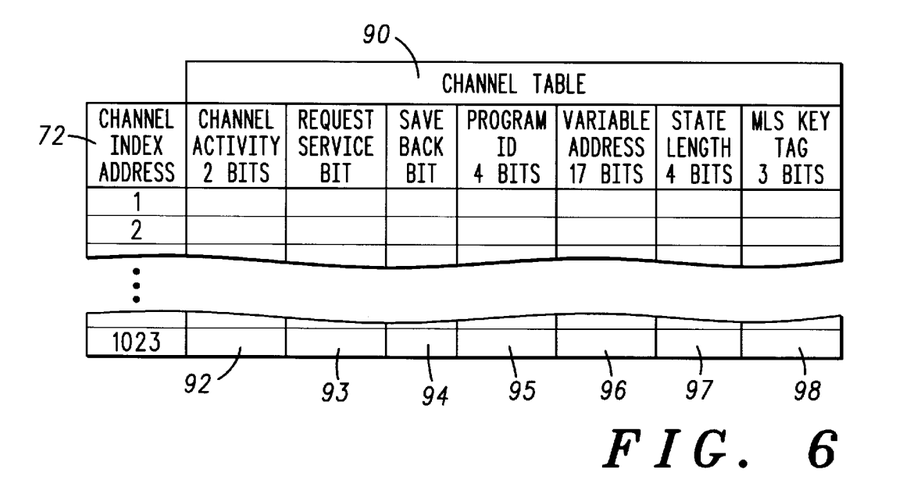
FIG. 6 illustrates a channel definition table suitable for use in a preferred embodiment of the present invention.

FIG. 6 illustrates a channel definition table suitable for use in a preferred embodiment of the present invention. Channel index field 72 (FIG. 4) of header Dword 66 (FIG. 4) is read by CC 11 (FIG. 1) to determine the row of channel table 90 that applies to that APDU. Channel table 90 defines the contents of the channel table fields and their lengths. In the preferred embodiment, channel table 90 is a 1024 word long by 32-bit table used to characterize each channel. CC 11 uses the fields of channel table 90 when setting up a channel program in processing engines 14 and 16. Channel table 90 includes allocated activity field 92 of 2-bits, request service bit 93, save back bit 94, program ID field 95 of 4-bits variable address field 96 of 17-bits, length field 97 of 4-bits and MLS key tag field 98 of 3-bits.

The information in channel table 90 is used to route the APDU to the appropriate processing resource and contains other information for installation or reinstallation of the specific communication thread for that channel. In general, the channel table contains pointers to locations where the program and context are located for channel definition. Channel index field 72 may also point to a channel which is not allocated to PCP 17. In this case, CC 11 may route the data unit to KMCE 12 where processing is performed. In general, processing is performed by KMCE 12 on an exception basis.

Channel index field 72 is assigned by the application program software executing on FS-RISC 26 and occurs at the creation/definition of a channel. The assignment of a channel index may be either fixed or dynamic depending on the specific application. Dynamic channel assignments involve an exchange of values at the time of channel creation so an external host, for example, may properly build APDUs. When a new channel is created or torn down, KMCE 12 creates a new entry or deletes an entry in the channel table 90. Channel table 90 in the preferred embodiment is stored in memory 19 of CC 11.

Each channel has a channel state associated with it which is stored inherently in CC 11. Channel states include a running current program state, a next or last state, a standby state, an installing state and an inactive state. A channel is in the running state when the current program state and context are executing on either the PCE 14 or CCE 16. In the preferred embodiment, PCE 14 and CCE 16 have a set of at least four memories which are selected in a ping-pong type fashion allowing a next channel to be loaded while the current channel is currently executing. The memory definition changes from active to shadow as this memory swapping occurs.

The next or last channel state indicates when the channel program is residing in shadow memory associated with the PCE 14 or CCE 16 as mentioned above. The standby channel state defines when the application program is residing in the CP-RAM 9 and ready to be installed into a shadow memory. The installing channel state is a channel state between standby and next or last, when the context associated with the channel program for one channel is being swapped with another. The inactive channel state is a state when the context and/or program are residing outside the control of PCP 17. The program may be residing in the KMCE 12 or in external context memory, for example.

Once a channel is established in PCP 17, external host applications can process an APDU in PCP 17 on a per channel basis without intervention from the application program executing in the FS-RISC 26. Accordingly, maximum throughput during functions such as encryption or decryption is achieved by per channel autonomous processing in PCP 17. Thus, a typical application passes APDUs through the PCP 17 without intervention of the KMCE 12.

Channel activity field 92 identifies valid channels, and includes the channel state information. Data units identifying invalid channel programs may be written to the FS-RISC 26 for processing. Channel activity field 92, when valid, indicates the processing activity of that channel. When a data unit is processed, channel activity field 92 is updated. Channel activity field 92 may also be used by KMCE 12 to determine which channels are less frequently used and accordingly, may be removed with the least impact to system 10. In the preferred embodiment, channel activity field 92 is updated sequentially, for example through the numbers "01", "10" and "11". The current value is stored with the channel being used to process a specific APDU. The value in channel activity field 92 represents the last used state of the channel.

Request service bit field 93 indicates when the application program executing on PCE 14 or CCE 16 needs to read new values for global variables which have been updated by the application program executing on FS-RISC 26. Accordingly, when the request service bit is set, FS-RISC 26 provides additional information before the program begins. Save back bit 94 indicates the way that CC 11 uses for saving context. For example, context may be saved either to CP-RAM 9 or an external memory. Context is generally saved back after a channel program installed in one of the processing engines changes some or all of the existing context. Through the use of save back bit 94, many APDUs may run on the same channel causing changes to the context. When the channel is moved out of one of the processing engines, the context is saved back to of an internal or external memory. Accordingly, useless saves may be avoided.

Program ID field 95 contains an ID code for the algorithm or program. Preferably, program ID field 95 points to a row in a program address table residing in memory 19 of CC 11. The program address table, among other things, defines the fields that CC 11 uses to keep track of different programs. Variably address field 96 defines the starting address in a memory location in PCP 17 where variable data for the channel are located. Through the use of variable address field 96, CC 11 determines if the variable is currently in the active memory, shadow memory, variable or state memory. Additionally, variable address field 96 may indicate to CC 11 that the variable data is in CP-RAM 9 and should be moved into an active or shadow memory of either PCE 14 of CCE 16 for variable state. The memory address for shadow and active memories are preferably fixed so CC 11 may determine if the APDU is ready to be executed or if the APDU should be staged in a shadow memory. While an APDU is staged in a shadow memory, the channel parameters for that channel, such as the program variable and state, are loaded into the processing engine.

State length field 97 defines the length of state variable data discussed above. In the preferred embodiment, state length field 97 varies between zero and thirty-two Dwords. MLS key tag field 98 lists the security level of the channel key. The value in key tag field 98 is compared to the tag received in MLS tag field 75 of header Dword 66 of the APDU. The security level of the channel key listed in key tag field 98 should be higher than the security level of the data, as identified in MLS tag field 75 of header Dword 66 for the data unit to be processed.

Figure 7:
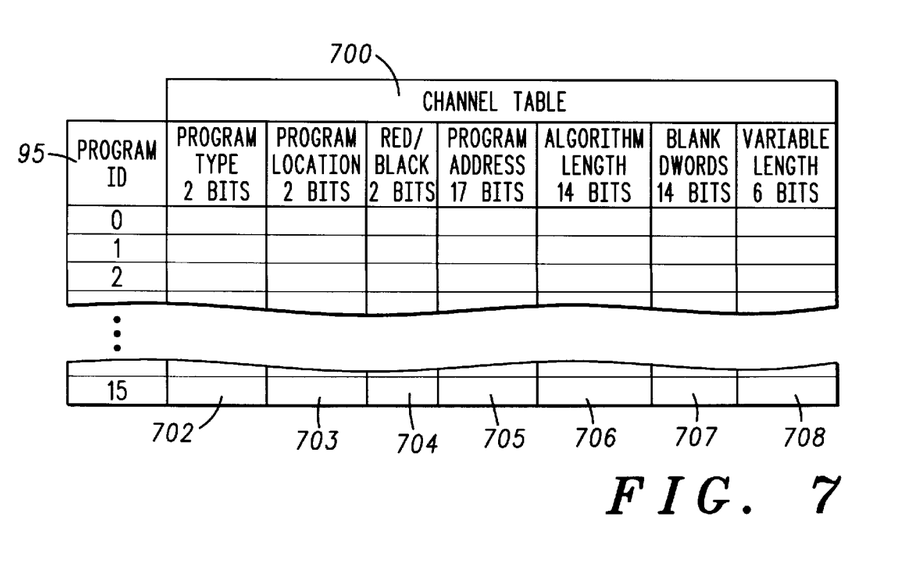
FIG. 7 illustrates an example of a program address table suitable for use in a preferred embodiment of the present invention.

FIG. 7 illustrates an example of a program address table suitable for use in a preferred embodiment of the present invention. Program address table 700 has program type field 702, program location field 703, red/black field 704, program address field 705, program length field 706, blank Dwords field 707 and variable length field 708. The program ID field 95 (FIG. 6) from channel table 90 points to a row of channel address table 700. Accordingly, each channel is associated with a row in program address table 700.

Program type field 702 is a two-bit field that identifies the size of the channel program, for example, as either large or small. Program type field 702 also identifies the execution unit on which the program runs, for example PCE 14 or CCE 16. Program location field 703 identifies the location of the channel program for that channel. CC 11 uses program location field 703 to determine the location of a program when it is needed for processing an APDU. Program location field 703 also may indicate when a program should be loaded by FS-RISC 26. Program location field also may indicate that there is only one copy of that program and it is permanently resident in a processing engine such as PCE 14 or CCE 16. Program location field 703 may also indicate that the channel program is in CP-RAM 9 and is to be copied when needed to the appropriate processing engine. Program location field 703 may also indicate that the program is in external memory and is copied into system 10 as needed. When a program is in external memory, the program may have to be decrypted by KMCE 12 before installation on one of the processing engines.

Red/black field 704 is preferably a two-bit field that identifies a security level of the program. Red/black field 704 indicates, among other things, whether the program is a secure program or not a secure program. Secure programs should be encrypted before moving to a black external memory, and be decrypted after moving the program from an external memory. Non-secure programs do not have to be encrypted before moving from or to a external memories. In the preferred embodiments of the present invention, red/black field 702 is not used when external memory is not used for program storage or is not available for program storage.

Program address field 705 contains an address pointer identifying a memory location of the channel program or program for that channel. The memory location may be in PCE 14, CCE 16, CP-RAM 9 or external memory. CC 11 uses program address field 705 to locate the channel program and move it into a shadow memory of a processing engine. In a case where the specific program is permanently loaded into a the processing engine, then the program address may contain a value to indicate that the program does not need to be moved.

Program length field 706 identifies the size of the channel program's micro-code stored in memory. Blank Dwords field 707 indicates the number of zero or blank Dwords that CC 11 writes to a memory location after CC 11 has installed the program in that memory. The zero or blank Dwords are written into the program space of the processing engine following the program that was previously installed to assure that the program space has been overwritten.

Variable length field 708 contains the length of the variable used in this particular program. The variable length may be the same for all channels using the same program. The length of the program variable is preferably between zero and thirty-two Dwords. CC 11 uses the variable length when installing the context of a channel into a processing engine.

Figure 8:
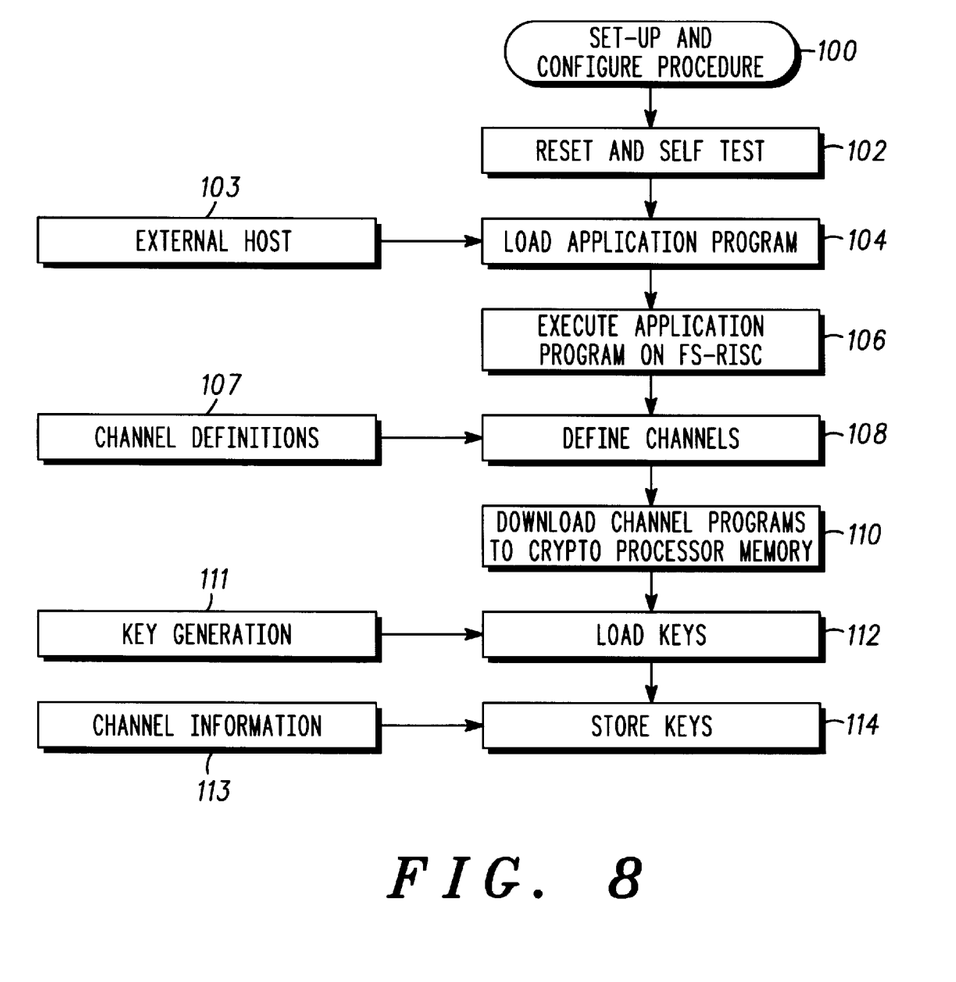
FIG. 8 is a flow chart of a set-up and configuration procedure suitable for use in a preferred embodiment of the present invention; and, FIG. 9 is a flow chart of a data unit processing procedure suitable for use in a preferred embodiment of the present invention.

FIG. 8 is a flow chart of a set-up and configuration procedure suitable for use in a preferred embodiment of the present invention. Procedure 100 is performed by system 10 for, among other things, defining the channels, and loading the associated channel programs into PCP 17. The programmable crypto processing system of the present invention, through its superscaler programmable architecture, may have several programs operating simultaneously. These programs are installed from a master application program running on the secure operating system of FS-RISC 26. In task 102, KMCE 12 performs a reset and self-test process to assure that the components and subsystems of system 10 are operating properly. In task 104, a master application program is loaded from external host 103 into KMCE 12. In an alternate embodiment of the present invention, an application program is resident within memory 25 of KMCE 12, and is loaded from memory 25 to FS-RISC 26.

In task 106, the application program loaded in task 104 is executed, preferably on the secure operating system of FS-RISC 26.

In task 108, the application program instructs CC 11 to create and define a plurality of channels using channel definition information 107. Channel definition information 107 may be stored within system 10 or provided by an external host. During this step, a channel table such as the channel table 90 (FIG. 6) is created. Furthermore, a program address table such as program address table 700 of FIG. 7 is also created. In the preferred embodiment of the present invention, these tables are stored in shared memory 18 (FIG. 1). During task 108 of setup and configure procedure 100, the channel programs are preferably not installed in processing engines 14 or 16. The channel programs are installed for a particular data unit when the data unit is processed. For example, the channel index of an APDU causes CC 11 to select the channel program to run and the CC 11 installs this program and starts the execution of the program in the appropriate processing engine.

Channel definition information 107 includes information defining the association of context with a specific program or program segment. A single thread of execution code is an example of a channel. In a multiprocessing system that swaps context, many simultaneous channels operate in time division owing to multiple channel operation. Accordingly, separate context for each channel is preferably maintained.

After the channels are defined and the channel programs are identified, in task 110, the application program downloads the specific channel programs to a memory such as CP-RAM 9 of PCP 17. There is preferably a channel program associated with each channel.

In task 112, encryption keys are loaded into system 10. Preferably, the keys are loaded through fill port 34 into programmable interface 21. Keys may include DES encryption keys, public and private keys and other types of keys well-known in the art of cryptography, including keys used for encryption, decryption, digital signatures and authentication. In the preferred embodiment, memory 25 has backup power, such as a battery, to prevent loss of keys in the event of a power failure to system 10. Task 112 optionally may include key generation task 111 which generates keys in FS-RISC 26. The key generation performed by FS-RISC 26 may include the use of public or private key generating software. FS-RISC 26 may generate channel or session keys in many ways known in the art including through the use of an internal randomizer. In the preferred embodiment, keys are associated with channels and are stored in a table that associates a channel with the appropriate key or key pair. In the preferred embodiment, keys are associated with each channel during initialization of FS-RISC 26. In one embodiment, the security level of the channel associates it with a particular key.

If task 112 includes key generation task 111, the keys may be made available to a key escrow. Task 112 may also include the task of providing the keys to a key escrow. In task 114, the keys are associated with a channel using channel information 113 and are stored in a memory, such as CP-RAM 9 or a local memory associated with PCE 14 or CCE 16 for use in processing data units. At the completion of task 114, system 10 is ready to process data units.

Figure 9:
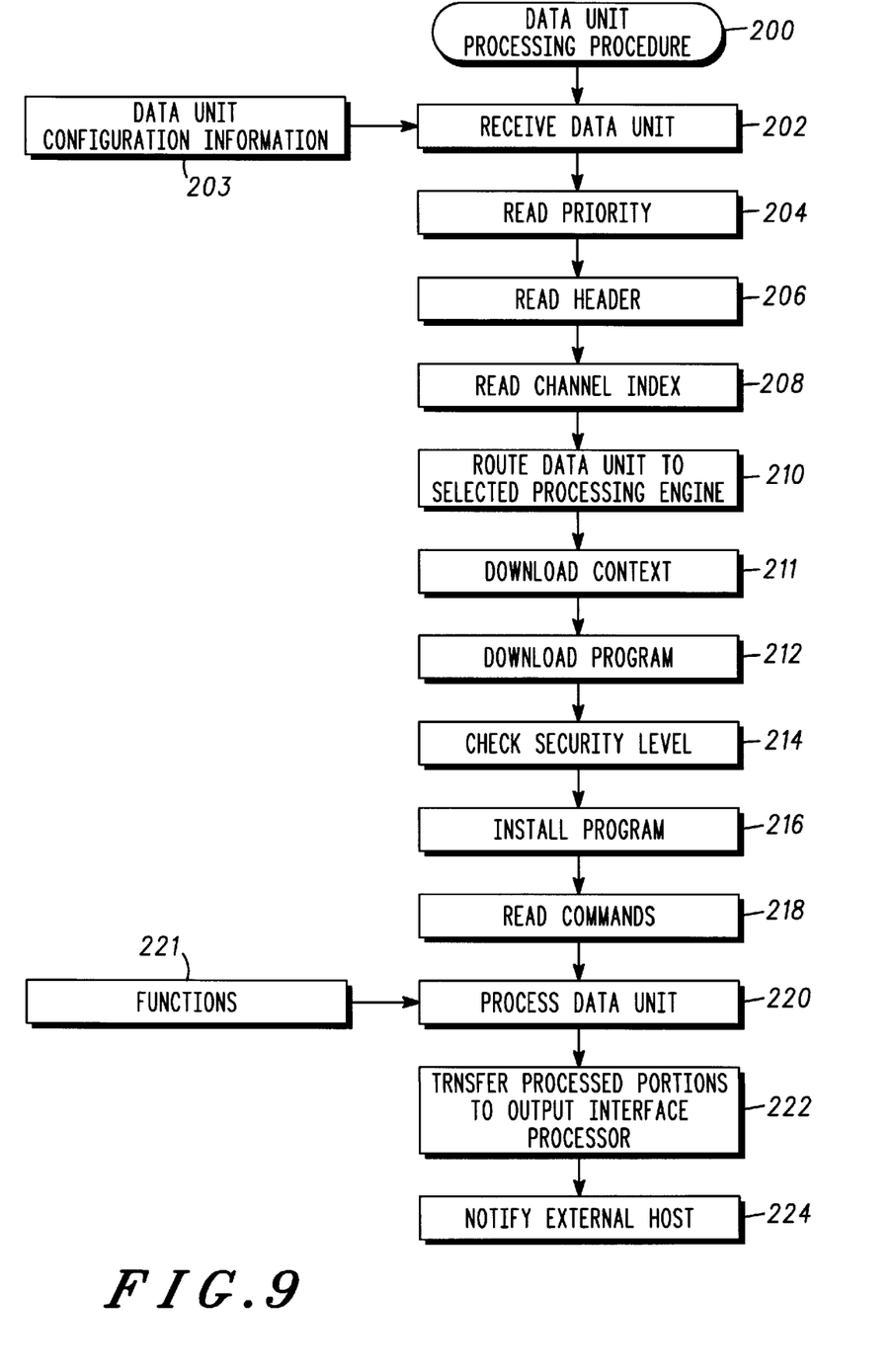

FIG. 9 is a flow chart of a data unit processing procedure suitable for use in a preferred embodiment of the present invention. In the preferred embodiment, procedure 200 is performed for each data unit received by system 10. In general, procedure 200 causes a function to be performed on each data unit. Functions include, for example, encryption, decryption, signing or authentication. After the function has been performed and the processed data unit is completed, system 10 makes the processed data unit available to an external host.

In task 202, data units are received at interface processor 13 or 15 from an external host. A data unit is preferably in APDU format as discussed in FIGS. 3–5. A data unit may be converted from another format to APDU format by an external host. For example, in the case of stream data not in APDU format, PTIP 13 or CTIP 15 may convert the stream data to APDU format using configuration information 203 stored in system 10. In the preferred embodiment, an external host converts data to APDU format before receipt by the interface processors in task 202, however, nothing herein precludes system 10 from converting data units to APDU format.

Configuration information 203 includes specific information base on the system application. For example, configuration information 203 may include the types of data units to be processed, the interfaces to be used, APDU format information, and when PTIP 13 or CTIP 15 creates the APDUs.

Task 202 may involve receiving the data units synchronously or preferably asynchronously. The data units may also be received in parallel or serial form through a parallel or serial port of the associated interface processor. When data units are received asynchronously, the interface processor notifies the external host that it is available to receive data units.

In task 204, the input interface processor reads the packet priority, (i.e., bit 76 of header Dword 66 (FIG. 4)) and schedules the processing for that data unit. In the preferred embodiment, packets with a real-time priority are first sent to CC 11 followed by any non-real time packets. As part of task 204, the interface processor notifies CC 11 that a new data unit is ready to be processed. In task 206, CC 11 reads the header of the data unit.

In task 208, CC 11 reads the channel index from field 72, the APDU type from field 71, and MLS tag field 75 of header Dword 66 of the data unit to determine the appropriate channel program and processing resource to process the data unit. CC 11 may also read APDU length field 84 as part of task 208.

In task 210, CC 11 instructs the interface processor to route the data unit to a processing engine, such PCE 14 or CCE 16, or FS-RISC 26. The processing engine is selected based on information from task 208. Channel index field 72 of header Dword 66 determines the execution unit to perform the processing on the data unit. In the preferred embodiment, the data unit is routed to CP-RAM 9, where it awaits processing by PCE 14 or CCE 16. Alternatively, a data unit may be routed to a shadow memory of PCE 14 or CCE 16 where it awaits processing by PCE 14 or CCE 16 respectively.

During task 210, a frame check sequence (FCS) checker in CC 11 checks the integrity of the data unit during the transfer. When a problem occurs with the FCS, a default response may be returned to the external host that provided the data unit. PDU length field 73 of header Dword 66 is used by CC 11 to allocate the memory in PCP 17. In one embodiment of the present invention, task 210 includes the routing of only the payload portions of a data unit to a processing engine.

In task 211, the context for the particular channel is downloaded. In task 212 CC 11 causes the channel program to be downloaded into the appropriate processing engine. Preferably, the program is loaded into a shadow memory of PCE 14 or CCE 16 (FIG. 1).

In task 214, MLS tag field 75 is compared with the tag in channel table (i.e., MLS key tag field 98) to assure that the security level of the program is at least as great as the security the data unit requires. When the data unit requires greater security than channel provides, the data unit is preferably not processed and a default response is returned to the input interface processor. The interface processor may send this default response the external host that provided the data unit.

In task 216, CC 11 installs the program from a shadow memory associated with the proper processing engine. As discussed above the data unit remains in shadow memory associated with a processing engine until the data unit is ready to be processed. Task 216 also involves the installation of the context for that channel program into the processing engine.

For some data units, the processing engine for a particular data unit is FS-RISC 26 (FIG. 1). In this situation, the application program is generally already running and accordingly, the program installation steps of task 216 may not need to be performed. In this situation, task 216 includes the task of CC 11 notifying KMCE 12 that a data unit has been loaded into a memory associated with FS-RISC 26 such as memory 25 (e.g., a mailbox for FS-RISC 26) and is ready to be processed.

In task 218 the commands associated with a data unit are read. Preferably, command Dword 67 (FIG. 3) of the data unit is read by the appropriate processing engine (task 210) to determine, among other things, the functions to be performed on the data unit. The processing engine is now ready to process the data unit. When the processing engine is either PCE 14 or CCE 16, the processing engine reads command Dword 67 from its storage location in CP-RAM 9. When the processing engine is FS-RISC 26, the CC 11 reads command Dword 67 from the data unit's location in memories 25.

After task 218 is performed, task 220 processes the data unit. Upon reading command ID field 81 in task 218, CC 11 causes the processing engine to select functions to be performed on the data unit by the appropriate channel program. In task 220 the key or keys associated with the selected functions and channel are loaded into the processing engine. In general, the function selected also determines where the processed data is sent. For example, an encrypt function may send the processed (encrypted) data to CTIP 15, while a decrypt function may send the processed (decrypted) data to PTIP 13. For internal data unit processing, the processed data may be sent to CP-RAM 9 for further processing, or to memory 25 for additional processing by FS-RISC 26.

Typical processing functions 221 include encrypt, decrypt, digital signature and authenticate. Other functions, including non-crypto related functions may also be performed, including functions not using a key. During task 222, the output interface processor accumulates the processed data unit. Preferably, as each Dword of a data unit is processed, the processed Dword is provided to the output interface processor. Once all the processed Dwords of a data unit are accumulated by the output interface processor, the output interface processor is notified that the data unit has completed processing, and that the interface processor has a complete processed payload portion of a data unit. Task 222 may also include the task of formatting the processed data unit for APDU format, and may include the task of adding header information, such as channel header Dword 66, and command information such as command Dword 67 (FIG. 3). Task 222 may also include the step of CC 11 notifying the output interface processor when the data unit has completed processing, and is in a proper format.

In task 224, the interface processor notifies an external host that the data unit is available for transfer to the external host. Preferably, the external host requests the data unit when the external host is ready to accept the processed data unit. For example, the external host and the output interface processor may engage in a handshake protocol to transfer the processed data unit. As part of task 224, the output interface processor clears its memory after the processed data unit is transferred.

In some cases, additional processing may be performed on a data unit. In task 222 if more processing is required on the data unit, the processed data unit is routed from PCE 14 or CCE 16 back to CC 11. CC 11 schedules the additional processing, and tasks 210–222 are repeated.

An application program determines when additional processing is to be performed on a data unit. Data units that are to have additional processing performed are formatted as an APDU to allow CC 11 to determine which process to schedule next. The sequence of execution of data unit processing is preferably determined by the channel program and implemented by CC 11 reading the channel number with the APDU to determine the next task to execute.

In one embodiment of the present invention, data units in APDU format are reformatted and reconfigured prior to task 224. For example, APDUs may be converted to a standard PDU format. This reformatting, reconfiguring or conversion may be performed by the output interface processor or by an external host.

Accordingly, a programmable cryptographic processing system has been described that has significant advantages over known technology. Among other things, the programmable crypto system of the present invention provides significantly improved performance for functions such as encryption, decryption and other secure services such as message authentication, message signature and others. The processing system of the present invention also support the increasing demand for high-grade, secure communication systems. The processing system of the present invention is programmable and supports multiple programs using a single ULSI design, and allows for interoperability with current and future communication devices.

The programmable cryptographic processing system and method is suitable for concurrently processing multiple cryptographic programs. The programmable cryptographic processing system and method allows for rapidly and securely switching of programs (e.g., algorithms) and context on each data unit processed.

Among other things, the programmable crypto system of the present invention supports a wide variety of applications. Each application may have several different and independent communication channels. Furthermore, each channel may have different cryptographic variables and states. The architecture of programmable crypto system of the present invention helps assure that the correct program and functions are executed in a fail-safe operation.

The programmable crypto system of the present invention also supports non-cryptographic processing such as framing and in-band signaling. In the preferred embodiments, the programmable crypto system is programmable and permits the system to be used in various equipment types resulting in added flexibility and lower costs.

In the preferred embodiment, typical processing throughput for crypto functions is on the order of 50 MBPS, including for simultaneous execution of a variety of programs. This capability is achieved among other things through the background staging of next tasks which provides a throughput advantage as well as supports multiple channel implementations.

The present invention provides a system having an architecture which allows multiple processes to operate concurrently. For example, high-speed code-book encryption applications may be concurrently run with high-speed serial decryptions along with public key operations such as digital signature. The programmable crypto system of the present invention is partitioned to help assure a solution for a variety of applications ranging from secure hand-held radios to securing high performance multiple channel radios and networks.

In a preferred embodiment, the processing system of the present invention supports this high performance processing with a super scalar architecture with concurrent processing capability. Deep pipeline machines are provided for high clock rate execution, packetized data unit processing, intelligent interface processors and single cycle task swapping via background task scheduling. The integration of these features into one system provides a performance advantage of approximately 10,000 times over implementations using standard commercial like processors.

One of the problems with the processing of multiple programs on standard commercial processors of DSPs is that there is significant performance loss due to task swapping in a secure operating system. The present invention provides for rapid secure task swapping in the background. Another problem with typical microprocessors and DSPs is that there is insufficient high speed parallel numeric and logical processing resources for high speed cryptographic processing. The system of the present invention has, in the preferred embodiments three high speed processing resources that accelerate cryptographic processing, and a low speed processor for lower speed requirements.

In typical cryptographic processing systems, key variable data is vulnerable when exchanged between subsystems.

This security risk is significantly reduced by the present invention through the use of a key management and controller subsystem and a cryptographic processing engines located on a single monolithic die. The extraction of data from the deep sub-micron level in operating equipment is very difficult and accordingly, helps prevent loss of data even from the most sophisticated attackers. In the ULSI embodiment of the present invention, the ULSI is preferably covered with a protective coating that prevents the probing of the surface of the die to further enhance the protection of such sensitive data.

Cryptographic program processing is preferably performed in a fail-safe architecture to help prevent any loss of sensitive data even when there is hardware failure. Typically, fail-safe designs result in typically added complexity, added cost, added power consumption and lower reliability. However, the present invention preferably incorporates fail-safe techniques which results in increased reliability, lowered power consumption and lower cost.

In the preferred embodiment, the present invention also allows upgrading of programs in the end user equipment. This allowance for continual upgrade of the cryptographic programs extends the useful life of the secured equipment and allows for the interoperability of the other equipment.

In the preferred embodiment of the present invention, the cryptographic programs are encrypted protected until they are loaded into the cryptographic engine. Once the encryption key is removed, the program is rendered non-recoverable. In the preferred embodiment, the key which is used to decrypt the program software is zeroed.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A programmable cryptographic processing system comprising:
   a programmable cryptographic processor for processing a data unit of a plurality of data units; and
   a cryptographic controller for identifying a channel program for processing said data unit based on information contained in said data unit, the programmable cryptographic processor processing said data unit in accordance with the channel program identified by the cryptographic controller.

2. A programmable cryptographic processing system as claimed in claim 1 wherein each data unit of said plurality of data units is comprised of a header field, a command field and a payload portion, and wherein the cryptographic controller comprises:
   means for reading the header field of said data unit;
   means for identifying said channel program from a plurality of channel programs for processing said data unit based on a channel index in said header field of said data unit;
   means for causing said channel program to be downloaded to a processing engine of said programmable cryptographic processor in response to said channel index;
   means for identifying a cryptographic key based on the identified channel program;
   means for determining a cryptographic function to be performed by the processing engine in accordance with the channel program using the cryptographic key;
   means for transferring said payload portion of said data unit to said programmable cryptographic processor in anticipation of processing by said processing engine.

3. A programmable cryptographic processing system as claimed in claim 2 wherein the command field identifies the cryptographic function to be performed on said data unit by said processing engine, the cryptographic function being identified from the group consisting of encryption, decryption, signing and authentication, wherein said programmable cryptographic processor further comprises:
   a first memory for storing said channel program;
   a second memory for storing said payload portion prior to processing said payload portion by said processing engine;
   means for reading said command field of said data unit to determine said function; and
   means for loading said channel program into said processing engine for execution of said function.

4. A programmable cryptographic processing system as claimed in claim 1 wherein each data unit of said plurality of data units is comprised of a header field, a command field and a payload portion, and wherein the programmable cryptographic processor includes a first memory for storing said payload portion and a second memory for storing a plurality of channel programs,
   wherein one channel program of said plurality of channel programs is downloaded to said second memory of a processing engine in anticipation of processing each of said data units.

5. A programmable cryptographic processing system as claimed in claim 1 wherein said data unit is a first data unit, and wherein the programmable cryptographic processing system further comprises:
   a first interface processor for receiving said first data unit from an external host; and
   a second interface processor, wherein said programmable cryptographic processor has means for transferring a processed data unit to said second interface processor during the processing of said first data unit, and
   wherein said second interface processor has means for notifying said external host when said first data unit has completed processing by said programmable cryptographic processor.

6. A programmable cryptographic processing system as claimed in claim 5 wherein said first interface processor includes means for asynchronously receiving data units of said plurality of data units from said external host, and wherein said second interface processor has means for asynchronously transferring processed data units to said external host.

7. A programmable cryptographic processing system as claimed in claim 6 wherein the programmable cryptographic processor, the cryptographic controller and the first and second interface processors are fabricated on a single die.

8. A programmable cryptographic processing system as claimed in claim 6 wherein each data unit of said plurality of data units are comprised of a header field, a command field and a payload portion,
   wherein said programmable cryptographic processor comprises at least two processing engines for performing a cryptographic function on said first data unit, and wherein the cryptographic controller comprises:
  means for reading the header field of said first data unit;
  means for identifying said channel program from a plurality of channel programs based on a channel index in said header field of said first data unit;
  means for selecting one of said processing engines based on said channel program;
  means for causing said channel program to be downloaded to said selected processing engine in said programmable cryptographic processor in response to said channel index; and
  means for transferring said payload portion of said first data unit to said programmable cryptographic processor in anticipation of processing by said selected processing engine.

9. A programmable cryptographic processing system as claimed in claim 1 further comprising a Key Management Cryptographic Engine coupled with said cryptographic controller, and wherein said programmable cryptographic processor further comprises a programmable cryptographic engine and a configurable cryptographic engine, and wherein said cryptographic controller has means for selecting one of said cryptographic engines for processing said data unit based on a channel index contained in said data unit, and means for routing said data unit to said selected one of said cryptographic engines in response to said channel index, said selected cryptographic engine executing said channel program on said data unit.

10. A programmable cryptographic processing system as claimed in claim 9 wherein context for said channel program is stored in an encrypted form in an external memory, and wherein said programmable cryptographic processing system further comprises means for decrypting said context causing said context to be transferred to said selected cryptographic engine prior to processing said data unit.

11. A programmable cryptographic processing system as claimed in claim 1 wherein the cryptographic controller has means for identifying said channel program from a plurality of channel programs for processing said data unit, and wherein the cryptographic controller has means for identifying context for said channel program, and wherein the programmable cryptographic processor has means for processing said data unit in accordance with said channel program and said context, said context comprising variable and state information for said channel program.

12. A data unit processing system for processing data units having a header portion, a command portion and a payload portion, wherein the header portion of a data unit identifies a channel program for processing said data unit, and the command portion identifies functions to be executed on the payload portion of said data unit, the data unit processing system comprising:
  a programmable cryptographic processor for processing said data unit in accordance with said channel program identified by the header portion of said data unit; and
  a cryptographic controller for reading said header portion and causing said channel program to be downloaded to a processing engine of said programmable cryptographic processor, said cryptographic controller causing said payload portion to be transferred to a memory for said processing engine to await processing by said channel program.

13. A system as claimed in claim 12 further comprising:
  a first interface processor for asynchronously receiving said data unit from an external host, and for notifying said cryptographic controller when said data unit is available for processing; and
  a second interface processor for receiving a processed data unit from said programmable cryptographic processor, for notifying said external host when said processed data unit has been received from said programmable cryptographic processor, and for asynchronously transferring the processed data unit to said external host.

14. A system as claimed in claim 13 further comprising a key management cryptographic engine, and, and wherein said programmable cryptographic processor further comprises a configurable cryptographic engine, and wherein said cryptographic controller has means for selecting one of said cryptographic engines for processing said data unit based on a channel index identified by said data unit, and means for routing said data unit to said selected cryptographic engine in response to said channel index, said selected cryptographic engine executing said channel program on said data unit.

15. A system as claimed in claim 14 wherein the cryptographic engines, the cryptographic controller and the first and second interface processors are fabricated on a single die.

16. A system as claimed in claim 15 wherein context for said channel program is stored in an encrypted form in an external memory, and wherein said data unit processing system has means for decrypting said context and causing said context to be transferred to said selected cryptographic engine prior to processing said data unit.

17. A method for processing a data unit in a processing system having a plurality of processing engines, the method comprising the steps of:
  identifying a channel program based on information in said data unit;
  identifying a processing engine from said plurality of processing engines for processing said data unit;
  routing said data unit to a memory;
  loading said channel program to said identified processing engine; and
  processing said data unit in said identified processing engine using said channel program.

18. A method as claimed in claim 17 wherein the identifying a channel program step further includes the step of identifying context for said channel program, and wherein the processing step includes the step of processing said data unit by said channel program, said channel program using said context.

19. A method as claimed in claim 17 wherein the data unit is a first data unit, and wherein the method further comprises the step of repeating the steps of identifying a channel program, identifying a processing engine, routing and loading for a second data unit, wherein said repeated identifying a channel program step identifies a second channel program for subsequently processing said second data unit.

20. A method claimed in claim 17 wherein said data unit is comprised of a header field, a command field and a payload portion, the method further comprising the steps of:
  reading the header field of said data unit;
  identifying said channel program from a plurality of channel programs for processing said data unit based on a channel index in said header field;
  selecting the processing engine based on said channel program;
  downloading said channel program to said selected processing engine in response to said channel index; and
  transferring said payload portion to a memory location for said processing engine in anticipation of processing said data unit by said processing engine.

21. A method claimed in claim 20 further comprising the steps of:
asynchronously receiving said data unit from an external host; and
asynchronously transferring processed data units to said external host.

22. A method for performing cryptographic functions in a programmable cryptographic processing system having a plurality of processing units, the method comprising the steps of:
receiving a data unit comprised of a header field, a command ID field and a payload portion;
selecting one of said processing units to perform a cryptographic function on said data unit based on said first header field;
routing said data unit to said selected one processing unit; and
said selected one processing unit executing said cryptographic function on said payload portion based on information in said command ID field.

23. A method as claimed in claim 22 further comprising the step of forming a processed data unit during the performance of the executing step, and wherein the method includes the step of notifying an external host when said processed data unit is formed.

24. A method as claimed in claim 22 wherein the routing step includes the step of routing said data unit to a memory for said one processing unit.

25. A method as claimed in claim 22 wherein the method further comprises the steps of:
identifying a channel program from the header field of said data unit, and identifying a cryptographic key based on the channel program; and
selecting one cryptographic function from the group consisting of encryption, decryption, signing and authentication to be performed by the processing unit in accordance with the channel program using the cryptographic key.

26. A method as claimed in claim 22 wherein the selecting one processing unit step further comprises the step of selecting an available one of said plurality of processing units to perform said cryptographic function.

27. A method as claimed in claim 22 wherein the step of executing said cryptographic function includes the steps of loading a key for performing said cryptographic function, and using said key to perform said cryptographic function, wherein the key is identified in response to a channel program determined from the header field.

28. A method as claimed in claim 22, wherein the data unit is a first data unit is a sequence of received data units, and wherein the method further comprising the step of selecting a second cryptographic function to be performed on a second data unit, and wherein the step of selecting one of said processing units, the step of routing, and the step of executing being performed for said second data unit, said first and second data units being received asynchronously from an external host.

29. A method as claimed in claim 22 further comprising the step of identifying a channel program from a plurality of channels programs in response to a channel index in the header field of the data unit, each channel program being associated with a key for performing said cryptographic function.

* * * * *